W. C. SALMON.
STEAM COOKING APPARATUS.
APPLICATION FILED JULY 2, 1912.
1,060,500.
Patented Apr. 29, 1913.
2 SHEETS—SHEET 1.
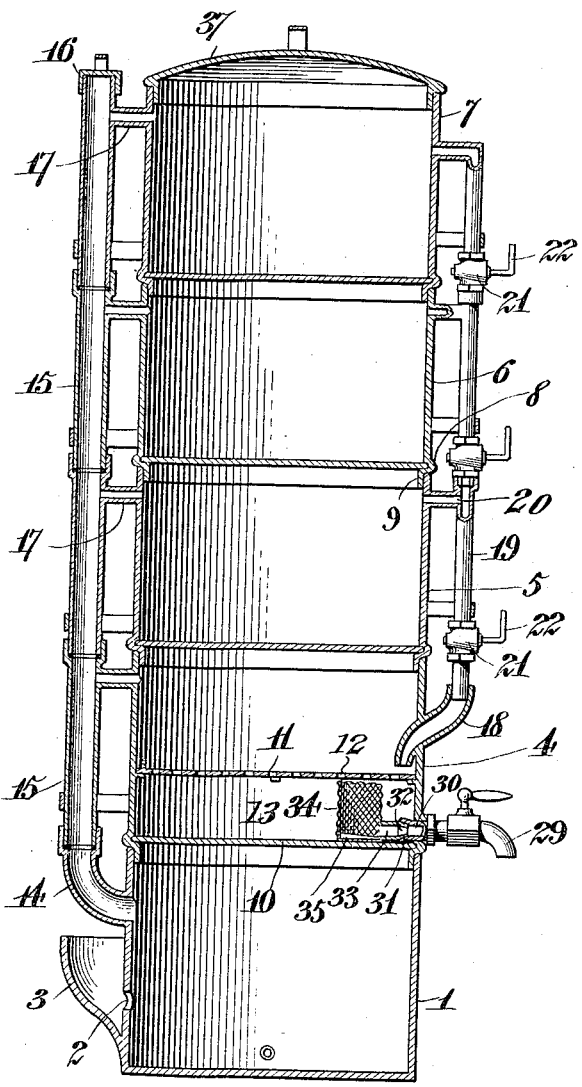
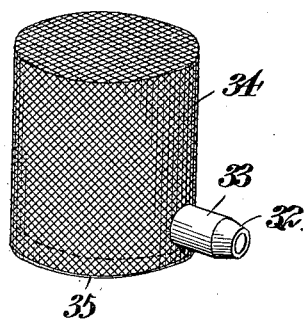
Witnesses:
Christ Feinle, Jr.
James Koabs
Inventor,
William C. Salmon.
By Victor J. Evans,
Attorney.

W. C. SALMON.
STEAM COOKING APPARATUS.
APPLICATION FILED JULY 2, 1912.
1,060,500.
Patented Apr. 29, 1913.
2 SHEETS—SHEET 2.
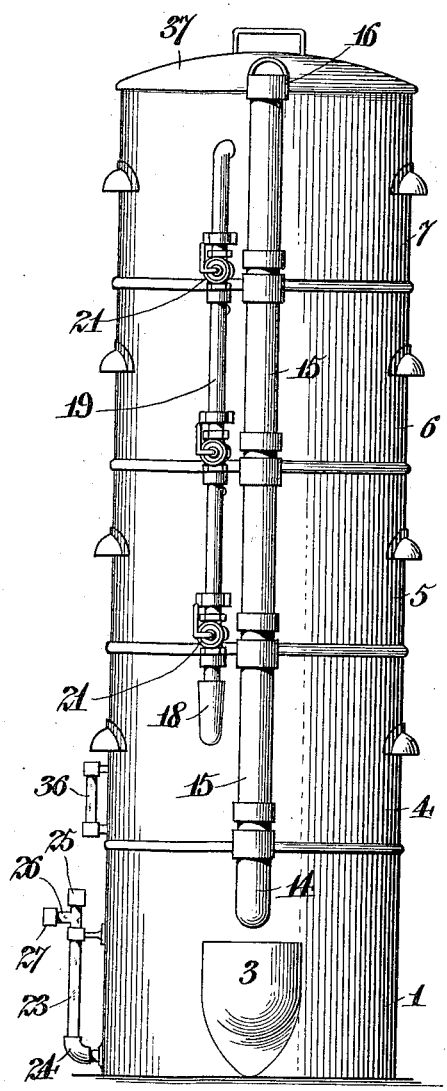
Witnesses:
Christ Feinle, Jr.
James Koch
Inventor,
William C. Salmon,
By Victor J. Evans,
Attorney.

UNITED STATES PATENT OFFICE.

WILLIAM C. SALMON, OF GOLD HILL, OREGON.

STEAM COOKING APPARATUS.

1,060,500.  Specification of Letters Patent.  Patented Apr. 29, 1913.

Application filed July 2, 1912. Serial No. 707,312.

*To all whom it may concern:*

Be it known that I, WILLIAM C. SALMON, a citizen of the United States, residing at Gold Hill, in the county of Jackson and State of Oregon, have invented new and useful Improvements in Steam Cooking Apparatus, of which the following is a specification.

This invention relates to steam cooking apparatus and has for an object to provide apparatus of this character in which the water of condensation may be commingled to produce a consummated element or liquid which can be served as soup and to provide means whereby the element may be flavored as it is drawn from the apparatus.

Another object of the invention is to provide an improved audible alarm which will be sounded on the fall of the water below a predetermined point in the steam generating chamber so as to inform the user that the supply of water must be replenished.

Another object of the invention is to provide a steam cooking apparatus which will include companion vessels that are connected with each other so that they may be readily disassembled whereby they may be subjected to a suitable cleansing bath and maintained in a highly sanitary condition.

Another object of the invention is to provide steam cooking apparatus wherein the distributing steam pipe and the drip pipe may be exteriorly located upon all of the different vessels so that each vessel will possess a maximum interior area to accommodate a large quantity of material.

Another object of the invention is to provide means in the drip receptacle whereby the commingled elements will be visible exteriorly so as to indicate to the user when the liquid has been properly consummated and is ready to be drawn off.

In the drawing forming a portion of this application, and in which like letters of reference indicate similar parts in the several views:—Figure 1 is a vertical longitudinal section through the apparatus. Fig. 2 is a similar view showing a slightly modified form of the invention. Fig. 3 is a perspective view of the combined strainer and flavoring extract container. Fig. 4 is a section on an enlarged scale through the boiler and through the combined gage and alarm.

The apparatus comprises a steam generating water chamber or boiler 1 which is open at the top, provided with an inlet aperture 2 and a combined guard and funnel like member 3 which is disposed at one side of the boiler and which opens in the direction of the aperture 2 whereby the supply of water may be replenished at the convenience of the operator. Receptacles 4, 5, 6 and 7 of practically similar construction are superimposed with respect to the boiler 1, the lowermost section being fitted thereto while the similar upper sections are detachably fitted together, each section being provided with an external annular bead 8 which rests upon the upper receptacle and a depending flange 9 which frictionally engages the inner walls of said adjacent receptacle whereby a steam tight connection is effected at the points between all of the sections. The receptacle 4 is provided with a main bottom 10 and a supplemental bottom 11, the latter having perforations 12 therein and spaced from the main bottom 10 so as to provide an intervening drip chamber 13 therebetween. The boiler 1 is provided with an elbow 14, while each of the receptacles 4, 5, 6 and 7 is provided with a steam conveying pipe section 15, the uppermost section having removably fitted thereto a cap 16. These pipe sections are fitted together in substantially telescopic manner whereby they are disposed in line with each other, and as shown, each section is provided with a branch portion or tube 17 which opens into the receptacle with which the particular pipe section is associated. From this construction it is evident that as steam is generated in the boiler section 1 of the apparatus it will be conveyed through the respective pipe sections 15 and then to the companion receptacles 4, 5, 6 and 7 so that the food articles in the different receptacles will be subjected to the full action of the steam.

The receptacle 4 is provided with a drip duct 18 while each of the sections 5, 6 and 7 is provided with a drip tube 19. These tubes are connected with each other in substantially telescopic manner and as illustrated the tube 19 of the receptacle 5 has its lower end frictionally engaged in the upper end of the drip duct 18, the said upper end of the duct being exteriorly located upon the receptacle 4 while the drip tubes 19 are correspondingly located so that each cooking receptacle will possess the maximum interior area. For the same reason the steam conveying pipe sections 15 are also exteriorly located upon the apparatus. The tube 19 of each receptacle is provided with one or more perforations 20 which open into the receptacle so that the waste steam will be conducted to the tube for a purpose to be hereinafter explained. Each drip tube carries a valve 21 which may be influenced or controlled manually through the lever 22 so that communication between the different tubes of the adjacent receptacles can be cut-off if desired.

In order that the user of the apparatus may be notified automatically when the supply of water in the boiler should be replenished I provide the boiler with a gage 23, preferably in form of a glass tube whose lower end is fitted to the elbow 24 which extends from the side of the boiler, while the upper end of the tube has a cap 25 removably fitted thereto whereby the tube can be cleaned when desired. A lateral projection 26 extends from the tube adjacent to the upper end thereof and fitted to the projection is a cap 27 whose outer end is open. This cap confines a whistle or like alarm device 28 to the projection 26 so that when the water in the boiler 1 is below the elbow 24 of the gage tube the generated steam in the boiler will pass to the tube where its pressure will be applied to the whistle with the resultant sounding of the same. The elbow 24 opens into the boiler 1 at a point above the plane of the bottom thereof so that the apparatus may be kept in operation for a considerable length of time after the sounding of the alarm.

The receptacle 4 of the apparatus is provided with a faucet 29 having an extension 30 which is disposed in the space 13 between the bottoms 10 and 11. The walls of the projection 30 are flared in the direction of the intake end of the valve so as to provide an annular seat 31 whose walls may be frictionally engaged with a correspondingly reduced end 32 of the tube 33. This tube extends from a combined strainer and container 34. The strainer may be constructed of wire gauze or suitable foraminous material and, as illustrated, at one end it has removably fitted thereto a slide or closure 35. It is stated that the foraminous bottom 11 of the receptacle 4 is removable, whereby when desired the combined strainer and receptacle 34 may be connected with or disconnected from the valve 29 as to the requirement. The receptacle carries a suitable gage glass 36 whereby the soup fluid during the period of consummation of the different commingled liquids may be viewed from the exterior of the apparatus whereby the fluid may be drawn off at the proper time by the user. A suitable cover 37 is removably fitted to the upper receptacle 7 of the apparatus.

Now that the details of construction of the apparatus are clearly disclosed, it is said, that in use, meat is placed on the foraminous bottom 11 of the lowermost food receptacle 4 while different vegetables are placed in the different receptacles 5, 6 and 7. When steam generates in the bottom 10 it passes to the different receptacles 4, 5, 6 and 7 by way of the pipe sections 15 and their branches 17 whereby the products in all of the receptacles will be correspondingly subjected to the action of the steam and thoroughly cooked. The vapors rising from the different products in the receptacles pass to the drip tubes 19 where the liquid of condensation will be discharged into the lowermost receptacle 4. In this way the different vapors from the different food stuffs will be commingled to produce a soup that may be drawn off through the valve 29. Spices or any suitable flavoring may be placed in the receptacle 34 where it will be satisfactorily exposed to the commingled liquids whereby a desirable seasoned element will be made. The receptacle 34, through the fact that it is disposed in the space 13 and associated with the valve 29 serves to strain the liquid as it is drawn off.

In the preferred embodiment of the invention shown in Fig. 1 the steam pipe sections 15 are supported upon one side of the structure while the drain tubes 19 are supported on the opposite side of the structure. In the modified form of the apparatus shown in Fig. 2 the steam pipe sections 15 and the drip tube sections 19 are both supported on the same side of the structure.

I claim:—

1. A steam cooking apparatus comprising a boiler, superimposed receptacles removably fitted together and disposed above the boiler, the lowermost receptacle being provided with a main fixed bottom and a removable foraminous bottom, a drip duct opening in the direction of the foraminous bottom, drip tubes carried by the receptacles and opening thereinto and into the said drip duct, a steam pipe establishing communication between the boiler and all of the receptacles, a draw-off faucet carried by the lowermost receptacle and opening between the main and supplemental bottoms thereof, and a foraminous member detachably connected with the faucet.

2. A steam cooking apparatus comprising a boiler, superimposed receptacles removably fitted together and disposed above the boiler, the lowermost receptacle being provided with a main fixed bottom and a removable foraminous bottom, a drip duct opening in the direction of the foraminous bottom, drip tubes carried by the receptacles and opening thereinto and into the said drip duct, a steam pipe establishing communication between the boiler and all of the receptacles, a draw-off faucet carried by the lowermost receptacle and opening between the main and supplemental bottoms thereof, and a foraminous receptacle located between said bottoms and connected with the faucet.

3. A steam cooking apparatus comprising a boiler, superimposed receptacles removably fitted together and disposed above the boiler, the lowermost receptacle being provided with a main fixed bottom and a removable foraminous bottom, a drip duct opening in the direction of the foraminous bottom, drip tubes carried by the receptacles and opening thereinto and into the said drip duct, a steam pipe establishing communication between the boiler and all of the receptacles, a faucet carried by the lowermost receptacle and opening between the main and foraminous bottoms thereof, a receptacle of foraminous material connected with the faucet and disposed between said bottoms, and a closure for said receptacle.

In testimony whereof I affix my signature in presence of two witnesses.

WILLIAM C. SALMON.

Witnesses:
GEORGE MCCLELLAN,
H. A. MEARS.

Copies of this patent may be obtained for five cents each, by addressing the "Commissioner of Patents, Washington, D. C."